US006898542B2

(12) United States Patent
Ott et al.

(10) Patent No.: US 6,898,542 B2
(45) Date of Patent: May 24, 2005

(54) ON-LINE DEVICE TESTING BLOCK INTEGRATED INTO A PROCESS CONTROL/SAFETY SYSTEM

(75) Inventors: Michael G. Ott, Austin, TX (US); Gary Law, Georgetown, TX (US); Dennis Stevenson, Round Rock, TX (US); Riyaz Ali, Marshalltown, IA (US); Mark Nixon, Round Rock, TX (US); Tim Forsythe, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 63 days.

(21) Appl. No.: 10/404,156

(22) Filed: Apr. 1, 2003

(65) Prior Publication Data

US 2004/0199351 A1 Oct. 7, 2004

(51) Int. Cl.⁷ .............................................. G06F 19/00
(52) U.S. Cl. ......................... 702/108; 714/48; 340/514
(58) Field of Search ................................. 702/108, 118, 702/182–185, 188, 189; 714/25, 30, 36, 47, 48; 340/501, 506, 514, 531, 3.1, 3.43

(56) References Cited

U.S. PATENT DOCUMENTS

| 4,448,033 | A | 5/1984 | Briccetti |
| 5,768,119 | A | 6/1998 | Havekost et al. |
| 5,970,430 | A | 10/1999 | Burns et al. |
| 6,014,612 | A | 1/2000 | Larson et al. |
| 6,155,282 | A | 12/2000 | Zachary et al. |
| 6,186,167 | B1 | 2/2001 | Grumstrup et al. |
| 6,647,301 | B1 * | 11/2003 | Sederlund et al. ............ 700/79 |
| 2003/0062494 | A1 | 4/2003 | Snowbarger et al. |

FOREIGN PATENT DOCUMENTS

| EP | 1 091 199 | 4/2001 |
| GB | 2 274 929 | 8/1994 |

OTHER PUBLICATIONS

U.S. Appl. No. 10/117,007 entitled "System and Method to Manually Initiate an Emergency Shutdown Test and Collect Diagnostic Data in a Process Control Environment," which was filed on Apr. 5, 2002.

U.S. Appl. No. 09/707,580 entitled "Integrated Alarm Display in a Process Control Network," which was filed on Nov. 7, 2000.

U.S. Appl. No. 10/116,940 entitled "Control Device Test System with a Remote Switch Activation," which was filed on Apr. 5, 2002.

Search Report under Section 17(5) issued in GB 0407443.1 applicaton by the United Kingdom Patent Office on Aug. 5, 2004.

* cited by examiner

Primary Examiner—Edward Raymond
(74) Attorney, Agent, or Firm—Marshall, Gerstein & Borun LLP

(57) ABSTRACT

A process control or safety system within a process plant uses one or more testing blocks to effect the timely and safe operation of on-line testing routines within field devices, such as valves, used in the process control or safety system. These testing blocks, which are easy to implement and to place in the process control or safety system, enable the periodic or on-demand testing of field devices to be integrated into the normal and on-going operation of the process control or safety system without causing scheduling or connection problems and without the need to rely on maintenance or other personnel, thereby providing better monitoring of the operational status of the field devices used within the process control and safety systems. This functionality is especially important in safety systems, in which it is desirable to timely monitor or assess the operational status of the devices used to shut the process down when an unsafe condition arises, so as to assure that initiation of a shut down by the safety system actually results in a shut down of the system.

62 Claims, 4 Drawing Sheets

ON-LINE DEVICE TESTING BLOCK INTEGRATED INTO A PROCESS CONTROL/SAFETY SYSTEM

FIELD OF TECHNOLOGY

The present invention relates generally to process control and safety systems used in process plants and, more particularly, to a testing entity used to control the operation of on-line device tests within a process plant.

DESCRIPTION OF THE RELATED ART

Process control systems, like those used in chemical, petroleum or other processes, typically include one or more process controllers communicatively coupled to at least one host or operator workstation and to one or more field devices via analog, digital or combined analog/digital buses or lines. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses or lines to the field devices to control the operation of the process such as to open and close valves, etc. Information from the field devices and the controllers is typically made available to one or more applications executed by the operator workstation to enable an operator to perform any desired function with respect to the process, such as configuring the process, viewing the current state of the process, modifying the operation of the process, etc.

Furthermore, in many processes, a separate safety system is provided to detect significant safety related problems within the process plant and to automatically close valves, remove power from devices, switch flows within the plant, etc. when a problem occurs which might result in or lead to a serious hazard in the plant, such as a spill of toxic chemicals, an explosion, etc. These safety systems typically have one or more separate controllers apart from the standard process control controllers, called logic solvers, which are connected to safety field devices via separate buses or communication lines installed within the process plant. The logic solvers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event is detected, the safety controller takes some action to limit the detrimental nature of the event, such as closing valves, turning devices off, removing power from sections of the plant, etc. Generally, these actions include switching safety devices into a tripped or "safe" mode of operation which is designed to prevent a serious or hazardous condition within the process plant.

It is important for proper operation of both process control systems and safety systems that the field devices remain operational so that process control and safety control operations being performed using these devices are actually implemented. This fact is especially true with respect to valves and other field devices that have movable elements which have a tendency to become stuck and, therefore, not operate properly in response to control signals sent by a process control or safety system controller.

In the past, valves and other devices were generally periodically removed from a process to be tested off-line or were tested while still connected to the process but while the process was not in normal operation, e.g., operating to produce a product. Unfortunately, both of these off-line testing techniques prevented operation of the process during the test, took a great deal of time and manpower, especially to remove and replace valves and other devices being tested, and did not enable the field devices to be tested on demand, e.g., whenever such a test is desired to be initiated.

More recently, some field device test routines have been developed to enable a field device, such as a valve, to be tested on-line, i.e., during normal operation of the process. These on-line test routines enable testing of the operational condition of the field device without removing the device from the process and without stopping or interrupting the process during the test. In particular, some smart field devices, i.e., those having an on-board processor and a memory, enable an on-line self diagnostic test to be stored in the memory of the device and enable the test to be initiated by one or more commands sent to the device. The DVC6000 HART valve device manufactured by Fisher Controls International LLC is an example valve device that may include on-line testing capabilities in which the valve will undergo a partial stroke to determine if the valve is stuck or has some other detectable problem which may prevent or hamper the proper operation of the valve.

While these on-line self-tests can be initiated with maintenance software such as the Asset Management Software manufactured and sold by Rosemount, Inc., a maintenance person must connect up to the device and send a specific request to the device to initiate the self test. As a result, testing of the field devices with these on-line testing capabilities is only performed when a maintenance person establishes a specific and typically temporary connection with the device and requests the test, which still leaves the process control system or safety system vulnerable to a device failure when the maintenance person does not, for whatever reason, test the device enough or at the proper time, nor does it enable the control or safety system to know when the last device test has been performed or the results of that test. In fact, in the past, there has been no manner of integrating the on-line testing capabilities of these field devices with the process control or safety control programs which are using the devices to perform operations within the process, such as operations needed to produce a product or operations used in a safety system to shut the process down in response to the detection of a hazardous condition.

SUMMARY OF THE DISCLOSURE

A process control or safety system within a process plant uses one or more testing blocks to effect the timely and safe operation of on-line self-testing routines within field devices, such as valves, used in the process control or safety system. These blocks, which are easy to implement and to place in the process control or safety system may enable the periodic or on-demand testing of field devices to be integrated into the normal and on-going operation of the process control or safety system without causing scheduling or connection problems and without the need to rely on maintenance or other personnel, thereby providing better monitoring of the operational status of the field devices used within the process control and safety systems. These blocks may also monitor the status of the field device to detect problems with the field device. This testing and monitoring functionality is especially important in safety systems, in which it is desirable to timely monitor or assess the operational status of the devices used to shut the process down when an unsafe condition arises, so as to assure that initiation of a shut down by the safety system actually results in a shut down of that system.

In one implementation, a testing block may be stored in a safety or process control input/output device and is configured to receive commands from one or more other process control or safety routines or from a user, such as an operator, to enable and initiate periodic or on-demand testing of a field device, such as a valve. The testing block monitors the test to determine if the test is performed, detects the results of the test and may communicate theses results back to the control or other routine, or to the user, to thereby monitor the operational status of the field device. If the test indicates a faulty condition, such as stuck valve, the testing block, or another block receiving the results of the test may automatically send an alarm or alert to a process control or safety operator, may stop operation of the process, or may be used in any other desired manner within the process control or safety system. Additionally or alternatively, the testing block may monitor the status of the signals sent by the field device to detect a problem with the field device and generate an alarm or other signal in response to the detection of a poor, bad, abnormal, etc. status.

DETAILED DESCRIPTION

Figure 1:
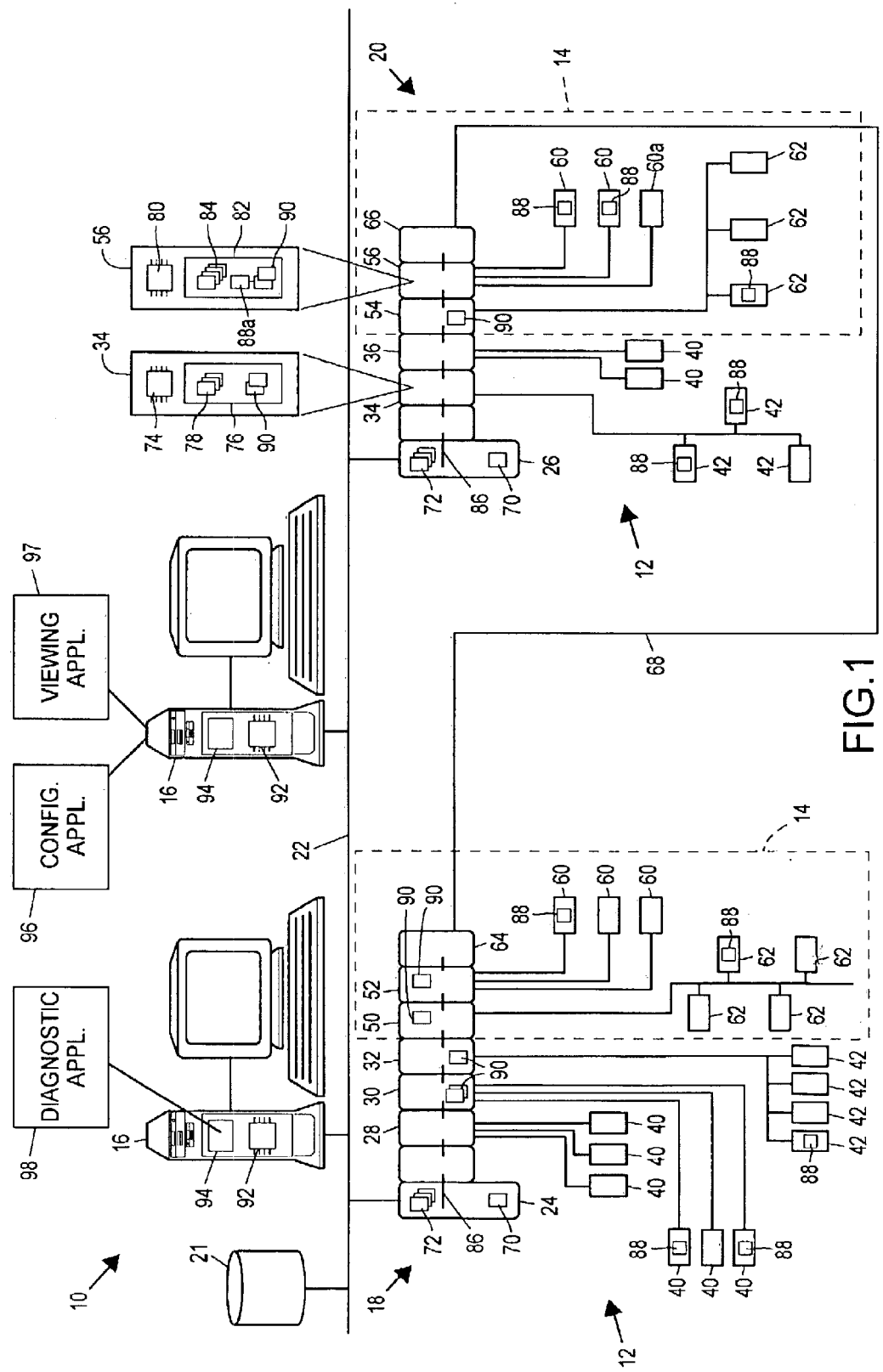
FIG. 1 is a block diagram of an exemplary process plant having a safety system integrated with a process control system and that uses one or more testing blocks to initiate and monitor the on-line self-tests performed on or by field devices within the process plant.

Referring now to FIG. 1, a process plant 10 includes a process control system 12 integrated with a safety system 14 (indicated by dotted lines), which generally operates as a Safety Instrumented System (SIS) to monitor and override the control provided by the process control system 12 to maximize the likely safe operation of the process plant 10. The process plant 10 (also referred to as the process control/safety system 10) also includes one or more host workstations, computers or user interfaces 16 (which may be any type of personal computers, workstations, PDAs, etc.) which are accessible by plant personnel, such as process control operators, maintenance personnel, safety engineers, etc. In the example illustrated in FIG. 1, two user interfaces 16 are shown as being connected to two separate process control/safety control nodes 18 and 20 and to a configuration database 21 via a common communication line or bus 22. The communication network 22 may be implemented using any desired bus-based or non-bus based hardware, using any desired hardwired or wireless communication structure and using any desired or suitable communication protocol, such as an Ethernet protocol.

Generally speaking, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28–36 and the controller field devices 40 and 42 generally make up the process control system 12 of FIG. 1.

Likewise, the node 18 includes one or more safety system logic solvers 50, 52, while the node 20 includes safety system logic solvers 54 and 56. Each of the logic solvers 50–56 is an I/O device that executes safety logic modules stored in a memory and is communicatively connected to provide control signals to and/or receive signals from safety system field devices 60 and 62. Additionally, each of the nodes 18 and 20 may include at least one message propagation device (MPD) 64 or 66, which are communicatively coupled to each other via a ring type bus connection 68 (only part of which is illustrated in FIG. 1). The safety system logic solvers 50–56, the safety system field devices 60 and 62, the MPDs 64 and 66 and the bus 68 generally make up the safety system 14 of FIG. 1.

The process controllers 24 and 26, which may be, by way of example only, DeltaV™ controllers sold by Fisher-Rosemount Systems, Inc., or any other desired type of process controllers which include a processor 70 programmed to provide process control functionality (using what are commonly referred to as control modules 72) using the I/O devices 28, 30 and 32 (for the controller 24), the I/O devices 34 and 36 (for the controller 26) and the field devices 40 and 42. In particular, each of the controllers 24 and 26 implements or oversees one or more of the process control routines 72 stored therein or otherwise associated therewith and communicates with the field devices 40 and 42 and the workstations 16 to control the process 10 or a portion of the process 10 in any desired manner.

As illustrated in a blown-up view for the I/O device 34, the I/O devices 28, 30, 34 and 36 associated with the process control system 12 each includes a processor 74, a memory 76 and one or more routines 78 stored in the memory 76 that are used to communicate with the field devices 40 and 42, with the controllers 24 or 26, etc. or that are used for other purposes. The field devices 40 and 42 may be any desired types of field devices, such as sensors, valves, transmitters, positioners, etc., and may conform to any desired open, proprietary or other communication or programming protocol including, for example, the HART or the 4–20 ma protocol (as illustrated for the field devices 40), any fieldbus protocol such as the FOUNDATION® Fieldbus protocol (as illustrated for the field devices 42), or the CAN, Profibus, the AS-Interface protocols, to name but a few. Similarly, the I/O devices 28–36 may be any known types of process control I/O devices using any appropriate communication protocol(s).

The safety logic solvers 50–56 of FIG. 1 may be any desired type of safety system control devices and, as illustrated in a blown-up view of the logic solver 56, each of the logic solvers 50–56 may include a processor 80, a memory 82 and one or more safety logic modules 84 adapted to be executed on the processor 80 to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4–20 ma protocol, while the safety field devices 62 are illustrated as using a bus communication protocol, such as a Fieldbus protocol. The safety field devices 60 may perform any desired function, such as that of a shut-down valve, a shut-off switch, etc.

A common backplane 86 (indicated by a dashed line through the controllers 24, 26, the I/O devices 28–36, the safety logic solvers 50–56 and the MPDs 64 and 66) is used in each of the nodes 18 and 20 to connect the controllers 24 and 26 to the process control I/O cards 28, 30 and 32 or 34 and 36, as well as to the safety logic solvers 50 and 52 or 54 and 56 and to the MPDs 64 or 66. The controllers 24 and 26 are also communicatively coupled to, and may operate as a bus arbitrator for the bus 22, to enable each of the I/O devices 28–36, the logic solvers 50–56 and the MPDs 64 and 66 to communicate with any of the workstations 16 or other controllers via the bus 22.

As is known, one or more of the field devices 40, 42, 60 and 62 may include on-line, device self-testing routines 88 stored therein. While self testing routines 88 are illustrated in FIG. 1 as being stored in a number of the field devices 40, 42, 60 and 62, it will be understood that these routines can be stored in any of the other field devices and can be any desired or available on-line self testing routine, such as those used in HART, Fieldbus or any other types of smart field devices. Of course, the device self-testing routines 88 of FIG. 1 need not be the same type of routine and will generally differ based on the type of field device (valve, sensor, etc.) in which they are located, the protocol to which the field device conforms, etc. Of course, the self-testing routines 88 are adapted to be executed on a processor within the field devices 40, 42, 60 and 62 in which these routines are located to perform self-testing on those field devices. One such self-testing routine which may be used in a valve to perform a partial valve stroke to detect the operational condition of the valve is disclosed in U.S. Pat. No. 6,186,167, issued Feb. 13, 2001 and entitled "Emergency Shutdown Test System." In addition, U.S. patent application Ser. No. 10/116,940 entitled "Control Device Test System with a Remote Switch Activation" which was filed on Apr. 5, 2002, discloses the activation of such a self test using a switch located on the field device. However, other on-line self-testing routines could be used instead or in addition to that described above.

Additionally, each of the I/O devices 30, 32, and 34 and each of the logic solvers 50–56 (which are communicatively coupled to field devices having self-testing routines 88 therein) includes a testing unit or block 90 that operates to communicate with a respective one of the self-testing routines 88 within the field devices 40, 42, 60 or 62 and with other elements within the process control/safety system 10 to thereby integrate the operation of the self-testing routines 88 within the functionality of the process control/safety system 10. As illustrated in the blown-up view of the I/O device 34 and the safety logic solver 56, the I/O devices 30–34 and the safety logic solvers 50–56 may include any number of testing units 90 stored in a memory thereof. Generally speaking, a different testing unit 90 will exist for each different self-testing routine 88 stored in a field device to which an I/O device or safety logic solver is connected, although this is not strictly necessary.

The testing units or blocks 90 generally cause the respective self-testing routines 88 to start, monitor the operation of the routines 88 and may automatically communicate the results of the tests to other elements within the process control/safety system 10 including, for example, to one or more of the control routines 72, the safety modules 84, the user interfaces or workstations 16, or any other entity which may benefit or use the results of the on-line self-diagnostic tests 88 on the field devices 40, 42, 60 and 62 to perform some functionality within the process control/safety system 10.

As will also be understood, each of the workstations 16 includes a processor 92 and a memory 94 that may store one or more configuration, diagnostic, viewing or other applications adapted to be executed on the processor 92. A configuration application 96 and a viewing application 97 are illustrated in an exploded view in FIG. 1 as being stored in one of the workstations 16 while a diagnostic application 98 is illustrated as being stored in another one of the workstations 16. However, if desired, these and other applications could be stored and executed in different ones of the workstations 16 or in other computers associated with the process plant 10. Generally speaking, the configuration application 96 provides configuration information to a process or a safety engineer and enables the process or safety engineer to configure some or all elements of the process plant 10 and to store that configuration in the configuration database 21. This configuration application 96 may be adapted to enable the process control or safety engineer to create and download both the self-testing routines 88 to the field devices 40, 42, 60 and 62 as well as to create and store or otherwise configure the testing units 90 in the different devices of the system 10.

Of course, as part of the configuration activities performed by the configuration application 96, the engineer may create the control routines or control modules 72 for the process controllers 24 and 26, may create the safety logic modules 84 for any and all of the safety logic solvers 50–56, may create the communication or other routines 78 stored in the I/O devices 28–36, may communicatively tie these and other applications to the testing units 90 and may download these different control and safety modules to the appropriate ones of the process controllers 24 and 26, the I/O devices 28–36, and the safety logic solvers 50–56 via the bus 22 and controllers 24 and 26. Similarly, the configuration application 96 may be used to create and download other programs and logic to the I/O devices 28–36, any of the field devices 40, 42, 60 and 62, etc.

Conversely, the viewing application 97 may be used to provide one or more displays to a user, such as to a process control operator, a safety operator, etc., which includes information about the state of the process control system 12 and the safety system 14 either in separate views or in the same view, if so desired. As part of these viewing functions, the viewing application 97 may provide the user with the ability to run or implement an on-demand, on-line self-test 88 within one or more of the field devices 40, 42, 60 and 62, and to set a periodic test rate for these devices, and/or may provide an alarm display that receives and displays indications of alarms or other test results determined by the routines 88 and collected by the testing units 90 to an operator or other user. If desired, such an alarm viewing application may take the form of that disclosed in U.S. Pat. No. 5,768,119 entitled "Process Control System Including Alarm Priority Adjustment" and U.S. patent application Ser. No. 09/707,580 entitled "Integrated Alarm Display in a Process Control Network," both of which are assigned to the assignee of this patent and are hereby expressly incorporated by reference herein. It will be understood, however, that the alarm display or alarm banner of these patents may receive and display alarms from both the process control system 12 and the safety system 14 in an integrated alarm display as the alarms from both systems 12 and 14 will be sent to the operator workstation 16 executing the alarm display application and will be recognizable as alarms from different devices. The viewing application 97 may enable an operator to deal with safety alarms displayed in an alarm banner in the same manner as process control alarms. For example, the operator or user may acknowledge safety alarms, turn off safety alarms, etc. using the alarm display, which will send messages via the appropriate process controllers 24, 26 to the testing units 90 using communications over the bus 22 and the backplane 86 to take the corresponding action with respect to the alarm. In a similar manner, other viewing applications may display information or data from both the process control system 12 and the safety system 14 as these systems may use the same types and kinds of parameters, security and referencing so that any data from one of the systems 12 and 14 can be integrated into a display or view traditionally provided for a process control system.

The diagnostic application 98 may likewise operate to automatically initiate an on-demand test of one or more of the field devices 40, 42, 60 and 62 by sending an appropriate signal to one or more of the testing blocks 90 and using the results of that test in further diagnostic activities. Additionally the diagnostic application 98 may operate to set up a periodic testing of one or more of the field devices 40, 42, 60, and 62 using the testing blocks 90. Of course, the diagnostic application 98 may initiate the self-tests 88 for any desired reason, may receive and use the results of these tests for any desired reason or as part of any desired application, it being understood that the diagnostic routine 98 uses the testing blocks 90 to initiate the on-line self tests 88 of the field devices 40, 42, 60, and 62 and to obtain the results of those tests.

Of course, other applications besides the applications 96–98 may be communicatively tied to the testing blocks 90 and cause the self-testing routines 88 to be run and/or may receive the results of these tests via the testing blocks 90 when these tests are executed. Likewise, any number of testing blocks 90 may be provided for any number of self-testing routines 88 stored in and executed by any of the field devices 40, 42, 60 and 62.

Figure 2:
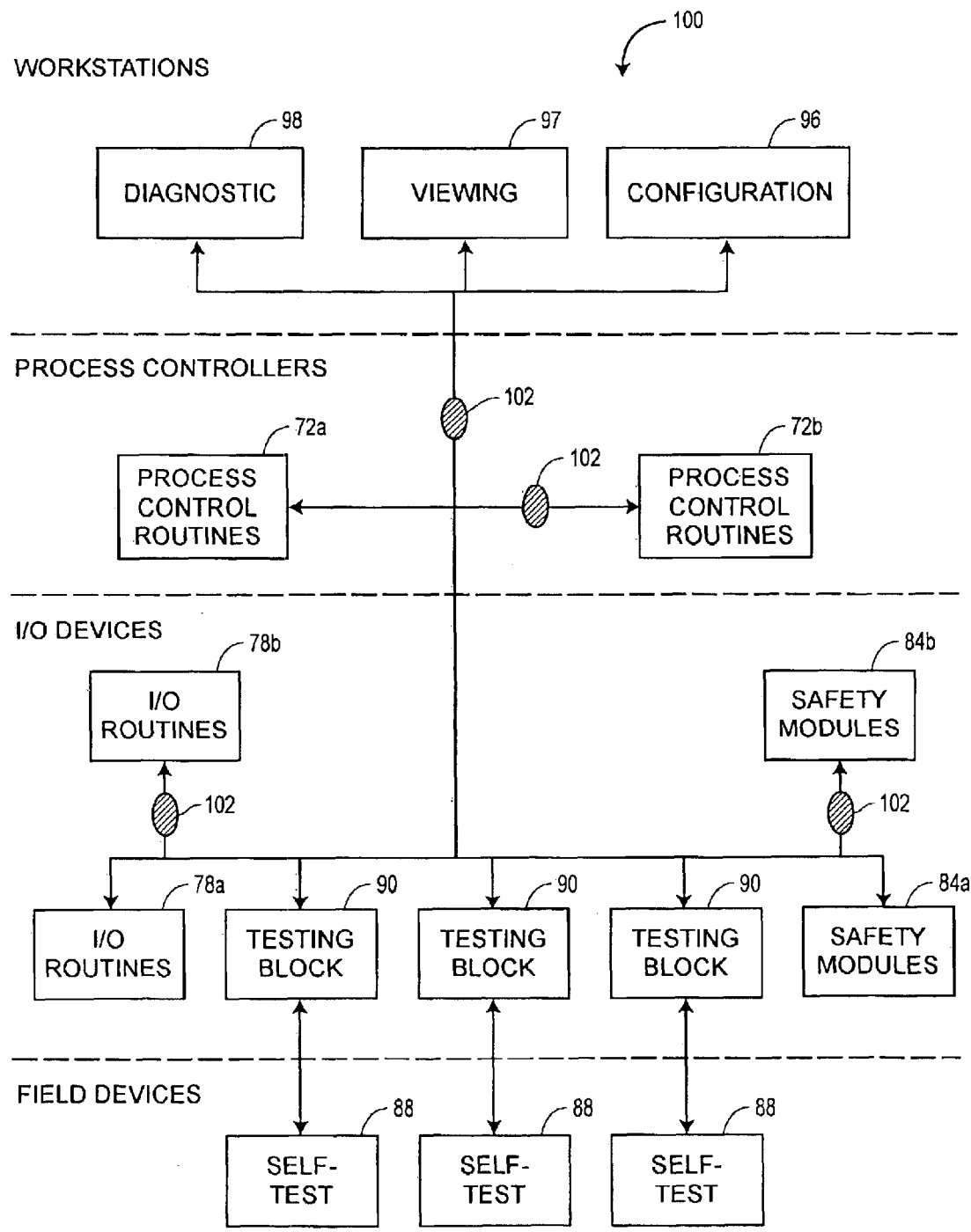
FIG. 2 is logical diagram of example testing blocks of FIG. 1 integrated in a process control/safety system.

FIG. 2 illustrates a logical diagram 100 of a manner in which different entities within the process plant 10 of FIG. 1 may communicate to implement the self-testing routines 88 and to monitor or receive the results of those tests. The blocks of FIG. 2 represent different routines or entities while the lines represent communication networks or paths. A solid line represents a direct communication link, such as one in the single device or a direct bus or other line connections between two devices, while a line with a //symbol (marked 102) represents an indirect communication link, such as one that goes through another device or through a protocol conversion. Furthermore, the dotted lines in FIG. 2 illustrate the location of the different elements, such as in the workstations 16, the process controllers 24 and 26, the I/O devices 28–36 and 50–56), and the field devices 40, 42, 60, 62.

As illustrated in FIG. 2, each of the testing blocks 90 may be communicatively connected to a different one of the self-testing routines 88 via a different or, in some cases, the same bus or communication network. The particular communication network being used will be dependent on the type of field device in which the self-testing routine 88 is located, such as in a HART or a Fieldbus field device. Similarly, each of the configuration application 96, the viewing application 97, the diagnostic application 98 as well as any other applications stored in or executed on the workstations 16 may communicate with one or more of the testing blocks 90 via an indirect communication network including the bus 22, the controllers 24 or 26 and the backplane 86. The process control routines, such as the routines 72a may communicate directly with the testing units 90 in the same node via, for example, one of the backplanes 86 and the process control routines 72b may communicate indirectly with the testing units 90 in a different node through, for example, the bus 22, the other of the controllers and the backplane 86. The direct communication occurs when, for example, a process control routine 72a in the controller 26 (of FIG. 1) communicates with a testing block 90 within one of the I/O devices 34 or 36 or in one of the safety logic solvers 54 or 56. The indirect communication may occur when, for example, a control routine 72b within the controller 26 communicates with a testing routine 90 stored in one of the I/O devices 30 or 32 or one of the safety logic solvers 50 or 52.

Additionally, the I/O routines 78a stored in the same node as the testing units 90 may communicate directly with those testing units 90 either because the I/O routines 78a and the testing units 90 are located in the same device or because the I/O routines 78a and the testing units 90 are connected through the backplane 86 of the same node. The I/O routines 78b may communicate with the testing units 90 of a different node via, for example, the backplane 86 (of a first node), the controller (of the first node) the bus 22, the controller (of the second node) and the backplane 86 (of the second node). Similarly, the safety modules 84a stored in the same node as the testing units 90 may communicate directly with those testing units 90 either because the safety module routines 84a and the testing units 90 are located in the same device or because the safety module routines 84a and the testing units 90 are connected through the backplane 86 of the same node. The safety modules 84b may communicate with the testing units 90 of a different node via, for example, the backplane 86 (of a first node), the controller (of the first node) the bus 22, the controller (of the second node) and the backplane 86 (of the second node) or via the backplane 86 of the first node, the MPDs 64 and 66, the bus 68 and the backplane 86 of the second node.

The communications between the different devices or elements within those devices may take the form of addressable messages, status messages, configuration messages or any other type of messages which may be sent to or generated by the testing blocks 90. In one case, the testing block 90 may simply effect status indications or fields of the I/O or safety logic device in which it is located and other applications or devices may interface with the testing block by reading those status indications or fields. Similarly, configuration of the testing block 90 may be performed by setting configuration fields or indications in the I/O or safety logic device in which the appropriate testing block 90 is located. Alternatively or in addition, the testing blocks 90 may be objects or other entities which can be addressed separately so that communications may be set up directly between applications and the testing blocks 90. In one example, one or more of the testing blocks 90 may take the form of a function block, such as a Foundation Fieldbus function block or any other type of function block and may be able to communicate directly with other elements or applications within the process control/safety system 10.

Generally speaking, the testing block 90 may enable either on-demand tests, such as those initiated by a user, a control or safety program, or any other application, person or entity within the process control/safety system 10 at any desired time and periodic tests which are automatically run or executed on a periodic or scheduled basis. Periodic testing is enabled by configuring the amount of time between tests and, additionally, the user may configure the period after the end of a successful test beyond which the testing block 90 generates a late test status or alarm. This alarm capability ensures that tests are run within a predefined timeframe for certification. Other events that can be used for alarming or event logging are, for example, test failures, denied tests, unsupported devices and successful tests. Additionally the testing unit 90 may monitor or provide the time until the next periodic test will occur, and the time since the last successful test was run. In one example, the testing unit 90 may initiate and monitor a valve partial stroke test on an emergency shutdown valve, such as the DVC 6000 ESD device manufactured by Fisher Controls International LLC, in order to test whether or not the valve stem can move. Additionally, the testing unit 90 may automatically monitor the status field of communications from any field device that provides a status indication in its communications to determine if the field device has a problem other than the problem detected by the self-test routine, such as a communication problem.

In one embodiment, the testing unit 90 (and thus the I/O device in which it is located) is responsible for self-test operations and sets status flags or variables in the I/O device based on the state of the testing unit 90. Of course, the controllers 24 and 26 and user interfaces 16 of FIG. 1 have the responsibility of forwarding requests from the user or other applications or entities within the process control/safety system 10, such as configuration messages and test start requests, and of handling security to prevent users from inadvertently disabling the field device in which the self test is run or located. The controllers 24 and 26 may generate their own start requests based on control or scheduling algorithms as needed. The controllers 24 and 26 may also generate events to be used for alarming and logging purposes based on the statuses set by the testing unit 90 within I/O or safety logic solvers in which the testing units 90 are located or by messages sent from the testing unit 90.

Generally speaking, the testing blocks 90 include communication capabilities adapted to communicate with one or, if desired, a group of self-testing routines 88 within the same or different field devices. The testing blocks 90 are configured to communicate appropriately to initiate the self-testing routines 88, to monitor the operation of the field device or the self-testing routines 88 and to obtain the results of the self-testing routines 88 as well as to communicate with the field devices and receive other status information from the field devices apart from the self-testing routines 88. Additionally, the testing block 90 will be able to communicate the results of the self-test, and possibly other information like the field device status information, to any desired entity within the process control system 10 using any desired communication techniques. Of course the testing units 90 may be implemented in the form of any desired software in any desired programming language or paradigm.

Figure 3:
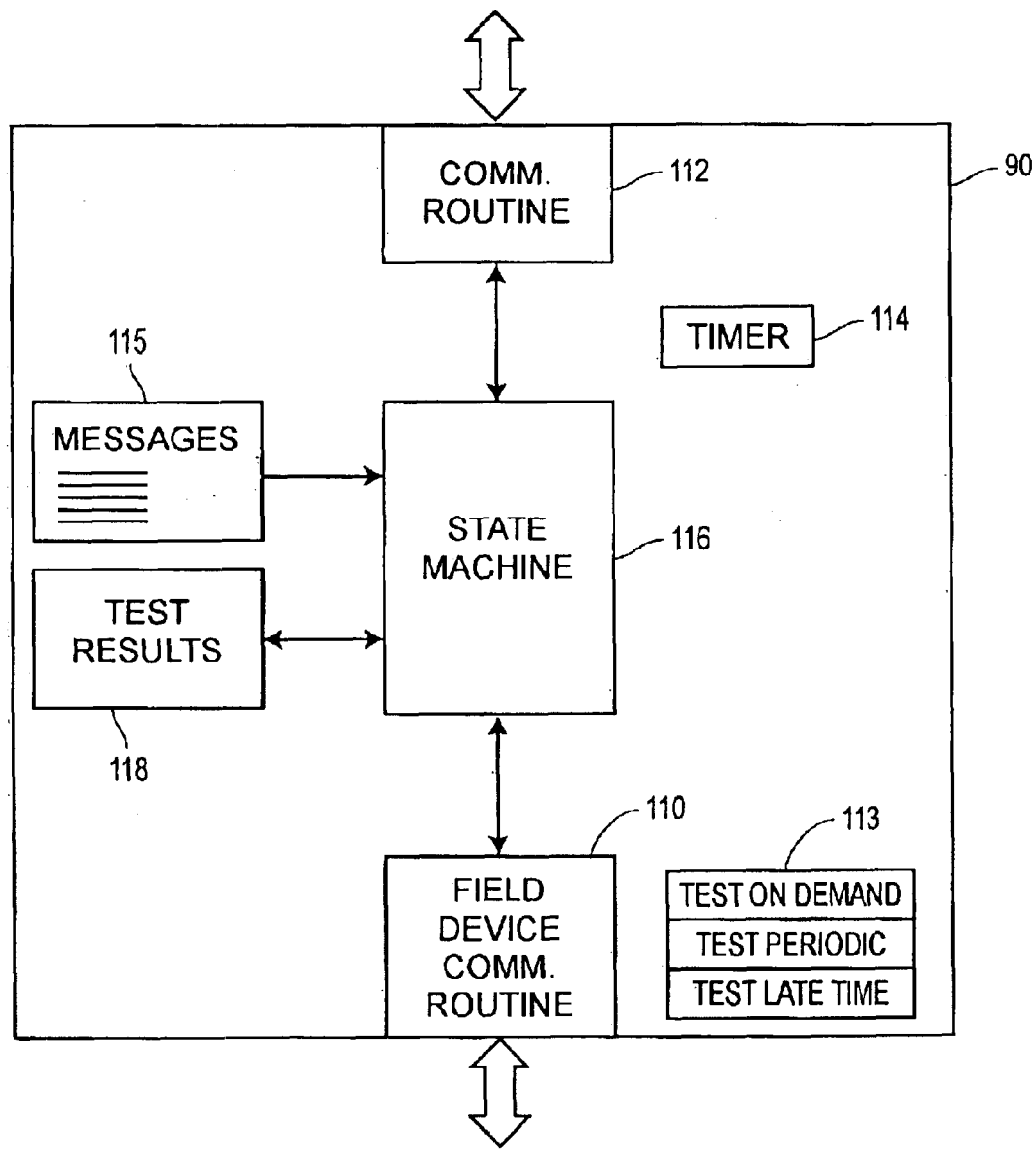
FIG. 3 is a block diagram of an example testing block of FIGS. 1 and 2.

As illustrated in FIG. 3, a testing unit 90 may include a field device communication unit or routine 110 which is adapted to communicate with one or more of the self-testing routines 88 in the field devices 40, 42, 60 and 62 using whatever signals or messages are needed to initiate and monitor those tests. As described herein, these messages are test initiation and monitoring messages and will be understood to be messages or communications in whatever form and protocol needed to initiate and monitor the actual self-testing routines 88. Of course these messages will be dependent on the type, nature and protocol of self test routines 88 and the communication networks connecting the field device in which the self-testing routines 88 are located and the I/O or safety logic devices in which the testing routines 90 are located. Additionally, the testing unit 90 will use the communication routine 110 to communicate with the field device in which a self-testing routine 88 is located (or even a field device that does not include a self-testing routine 88) to determine other status information generally provided by that field device, such as the status fields of the messages from that field device. Such status fields are usually provided in messages or communications from HART and Fieldbus field devices and indicate the status of the field device as good, bad, normal, abnormal, out of mode, etc. This additional status information, which is generated apart from the self-testing routines 88, can also be used to generate alarms, events or other messages to other process entities, such as control routines, safety modules, diagnostic applications, etc.

Additionally, the testing unit 90 may include a second communication unit or routine 112 for communicating with other entities within the process control and safety system 10, such as with the safety modules 84, the control routines 72, the I/O routines 78, the applications 96–98 or any other entities. Some of the messages or communications to and from the testing unit 90 may include status messages such as a TestRunning status which is set when a test is in progress, a TestSuccess status which indicates the end of a successful test, a TestFailed status which is set at the end of a test if the device is in a failure mode or if the test fails, a TestLate status which is set when an on-demand or periodic test is late in being executed, a TestDenied status which is set if the test cannot begin because the field device is unable to initiate the test, such as when the field device is in a calibration or diagnostic mode and a TestNotSupported status which is set when the field device does not support the requested test. The communication unit 112 may also be used to provide indications of the message status received from the field devices in which the self-testing routines 88 are located.

While the communication routine 112 is illustrated as being communicatively connected to other wired networks, such as the backplane 86 or to the controllers 24 and 26, it may additionally or alternatively be connected to a serial port on the I/O device in which the testing routine is located. A user may then connect a mobile configuration or communication device (such as a PDA, etc.) to the testing unit 90 via the serial port to thereby configure, control and obtain the results from the self-tests 88 in any desired manner. Alternatively, the serial port may be connected to a wireless network, such as to a satellite or cellular communication network, a wireless Ethernet connection, etc. to enable wireless communications between the testing unit 90 and other entities in the process which are located at vastly different geographical locations.

In the example of FIG. 3, the testing unit 90 includes configuration variables 113 indicated by the TestOnDemand variable, the TestPeriodic variable and the TestLateTime variable. The TestOnDemand variable may be set to enable on-demand tests to be initiated by the testing unit 90 upon receiving an on-demand test request by another application or a user within the process plant 10, and may be unset to disable the support for the on-demand tests. The TestPeriodic variable may be set to, for example, zero to disable the testing unit 90 from initiating automatic or periodic tests at a periodic rate. Alternatively, the TestPeriodic variable may be set to a non-zero value to configure the testing unit 90 to automatically request periodic tests of the field device using the self-testing routine 88 and the non-zero value may be the periodic rate at which these tests are to be automatically requested or initiated by the testing unit 90. Of course, if desired, a separate variable may be set to establish a periodic test request rate or even a non-periodic test schedule. The TestLateTime variable may be set to a value to indicate the time after the previous test, or on startup, beyond which, if no test is initiated, the late status is set indicating a late test. Other variables may be provided as desired to configure the timing, nature and type of tests to be requested.

The testing unit 90 may also include one or more timers 114 which can be used to time the periodic tests to be initiated by the testing unit 90 when the TestPeriodic variable 113 is set as well as to determine whether an alarm should be set or sent based on the TestLateTime variable 113. If desired, the timer 114 may be a timer with, for example, a one second resolution. Once the first successful test has been completed, an elapsed timer variable (not shown) may be incremented each second. This timer can be cleared at the end of each successful test. Furthermore, the value of this timer can be read by a user or by an application within the process plant at any time to determine how long it has been since the last time the test was run or since startup that the test was run if no test has yet been run. If the TestLateTime variable is enabled, a late timer initially set to that value can be decremented, if greater than zero, each second. When this timer reaches zero, the testing unit 90 may set the TestLate status to be sent via the communication unit 112 to a monitoring application, such as an alarm or controller application. This timer will be initialized with the TestLateTime at the end of each successful test, and on a change in value during configuration. Of course, the TestLate status can be cleared by a ClearTestStatus request, which may be sent to the testing unit 90 at any time. In one embodiment, upon acknowledgement of an alarm by a user, a controller or monitoring application may send the ClearTestStatus request to the testing unit 90.

If the TestPeriodic variable is set or enabled, a timer referred to herein as TestPeriodicTimer can be decremented, if greater than zero, each second. When this timer reaches zero, the testing unit 90 will generate an internal TestStart event, to start a new periodic test. This timer can be initialized with the TestPeriodic variable at the start of each successful test, and upon a change in value during configuration. Of course, a memory 115 may store the messages and data needed to perform all of these communications.

Likewise, in the example of FIG. 3, the testing unit 90 includes a state machine 116 that controls the operation of the communications which occur between the testing unit 90, the self-tests 88 and the other entities within the process control and safety system 10 using the timers 114, the variables 113, the messages and data stored in the memory 115 and, if desired, using the results of the self-tests 88 which may be stored in a memory 118. Of course, the testing unit 90 may store test result data, a period self-test execution rate, configuration data, such as whether to enable on-demand or periodic tests, etc. in any other manner to implement the operation of the state machine 116.

Figure 4:
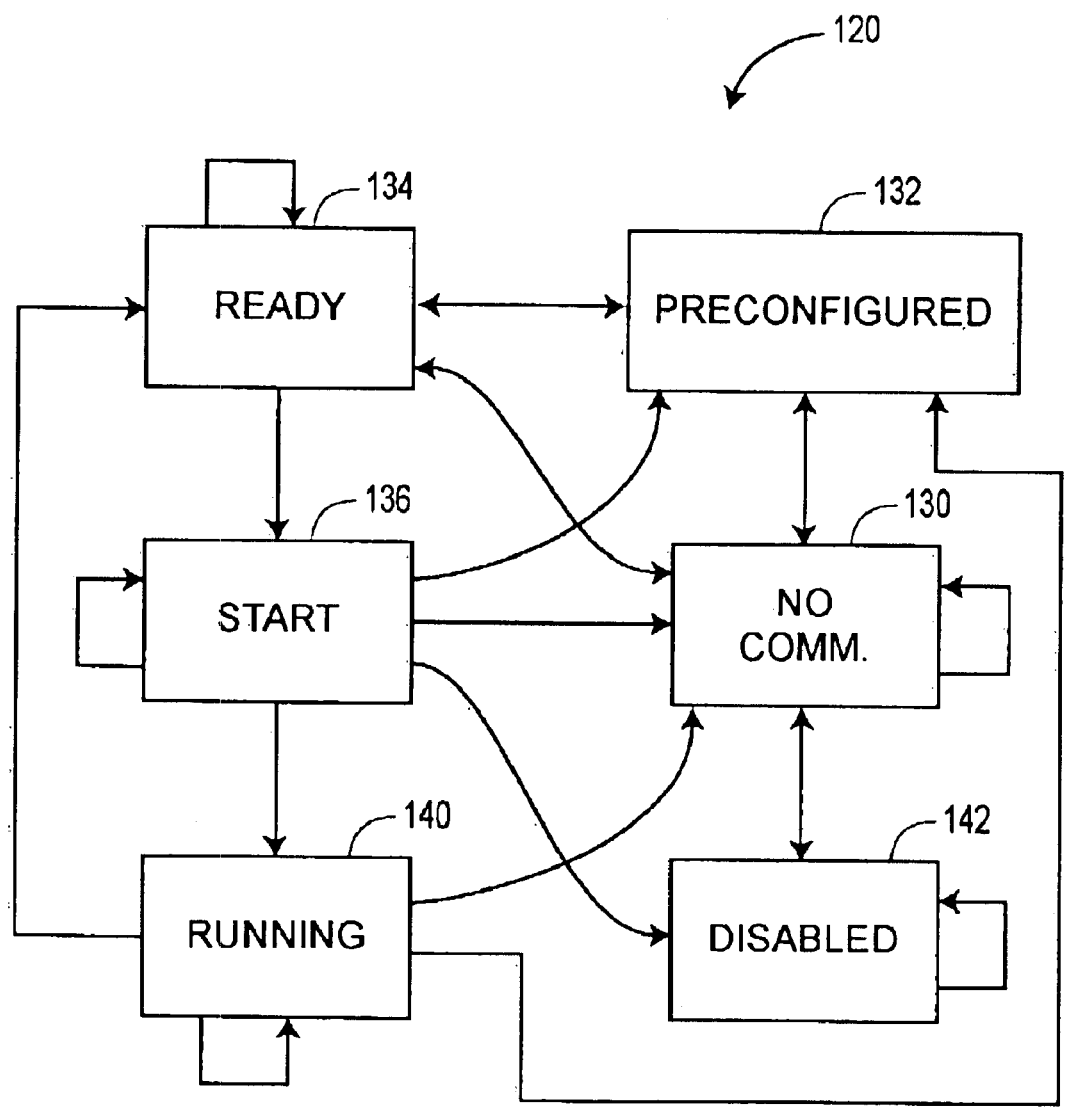
FIG. 4 is a state diagram illustrating a set of states that may be associated with a state machine within the testing block of FIG. 3.

FIG. 4 illustrates a state diagram 120 which may be used to describe the operation of the state machine 116 of FIG. 3.

In particular, the state diagram 120 includes a no communication state 130, a preconfigured state 132, a ready state 134, a start state 136, a running state 140 and a disabled state 142, each of which will be described in detail below. The possible transitions between these states are illustrated by arrows in the state diagram 120. Of course, additional, fewer and other states may be used. Also, the state machine 116 may be implemented in any desired manner using any desired software, hardware, firmware, etc., it being understood that the states in the state diagram 120 are exemplary in nature.

When in the no communication state 130, which may be entered into upon power-up, the state machine 116 (and therefore the processor within the I/O device in which the testing unit 90 is located) attempts to establish communications with the field device in which the self-test 88 associated with the testing unit 90 is located. Upon entering this state, the TestNotSupported and the TestRunning statuses are cleared. During this time, the I/O device or testing unit 90 sends a read request to the field device to obtain device information from the field device for the purpose of beginning to establish communications with the field device. If the field device is a HART device, the testing unit 90 may send a Read Unique Identifier HART request to the field device in short mode at address 0. If the message fails, the state machine 116 remains in the no communication state 130 but continues to attempt to establish communications with the field device. Upon a valid response from the field device, if both the TestPeriodic variable (defining whether periodic tests are to be allowed or supported by the testing unit 90) and the TestOnDemand variable (defining whether on-demand tests are to be allowed or supported by the testing unit 90) are disabled, the state machine 116 transitions to the preconfigured state 132. If either or both of the TestPeriodic variable or the TestOnDemand variable are enabled, the state machine 116 transitions to the ready state 134. If, in response to the message to the field device, the field device indicates that it does not support the test, then the TestNotSupported status is set and the state machine 116 transfers to the disabled state 142. (For example, if in response to the Read Unique Identifier message, the testing unit 90 receives a manufacturer or device ID that does not support the self-test 88, then the testing state machine 116 enters the disabled state 142.) When in the no communication state 130, the testing unit 90 will respond to a request for the start of a self-test with a RequestFailed status indicating that the request for an on-demand self-test failed. Of course, the testing unit 90 may communicate that it is in the no communication state to other entities within the process plant in any desired manner, such as using a status variable in the I/O device in which the testing unit 90 is located.

When in the preconfigured state 132, the I/O device in which the testing unit 90 is located communicates with the field device, and the TestPeriodic and the TestOnDemand variable are both disabled. During this state, the I/O device may communicate with the field device to read variable data of the field device. If the field device is a HART device, the testing unit 90 may send a Read Dynamic Variables HART request to the field device. However, the testing unit 90 remains in the preconfigured state until configured or until the testing unit 90 losses communication with the field device. If the testing unit 90 loses communications with the field device, the state machine 116 transitions to the no communication state 130. However, if the testing unit 90 receives a configuration message such as one that enables the TestOnDemand variable and/or the TestPeriodic variable, the state machine 116 transitions to the ready state 134 as it is now configured. When in the preconfigured state 132, the testing unit 90 will respond to a request for the start of a self-test with a RequestFailed status indicating that the request for an on-demand self-test failed.

When in the ready state 134, the testing unit 90 waits for a TestStart request to start an on-demand self-test 88, or waits for an internal TestStart event to occur, as defined by the operation of the timers 114 and the TestPeriodic variable. The ready state 134 is only entered if either the TestOnDemand variable or the TestPeriodic variable is enabled and the testing unit 90 is communicating with the field device. Upon entering the ready state 134, the state machine 116 clears the TestRunning status, and sends a read request to the field device to read appropriate variables of the field device or to otherwise determine if the field device is ready to run a test. If the field device is a HART device, the testing unit 90 may send a Read Dynamic Variables HART request to the field device. If the testing unit 90 loses communications with the field device, the state machine 116 transitions to the no communication state 130. When in the state 134, if the testing unit 90 is reconfigured by, for example, both of the TestPeriodic variable and the TestOnDemand variable becoming disabled, the state machine 116 transitions to the preconfigured state 132.

If the timer 114 issues an internal TestStart event to begin a periodic test (and the TestPeriodic variable is enabled) or if the testing unit 90 receives an on-demand TestStart request (and the TestOnDemand variable is enabled), the testing unit 90 transitions to the start state 136. Prior to entering the start state 136 upon receiving a TestStart request, the state machine 116 may send a RequestSuccess status, indicating that the on-demand test request was successful. If the testing unit 90 receives and on-demand test signal and the TestOnDemand variable is disabled, the state machine 116 may respond with a RequestFailed status, indicating that the on-demand test request failed.

When in the start state 136, the state machine 116 initiates the self-test routine 88 which may be, for example, a partial stroke test, using the appropriate messages in the appropriate protocol. The state machine 116 may send a Read Dynamic Variables HART request to a HART field device. If the field device supports the test, the state machine 116 sends a start test signal to the field device to initiate the test. However, if the field device does not support the test 88, then the state machine 116 transitions to the disabled state 142. Upon a successful response to the request by the field device, the state machine 116 transitions to the running state 140. If any other error is returned in response to the TestStart request, the state machine 116 sets the TestDenied status. In this case, no state transition occurs and the start state 136 is repeated.

If the testing unit 90 loses communications with the field device during the start state 136, the state machine 116 transitions to the no communication state 130. If the testing unit 90 is reconfigured such that both the TestPeriodic variable and the TestOnDemand variable are disabled, the state machine 116 transitions to the preconfigured state 132. If the testing unit 90 receives a TestStart request, and the TestOnDemand has been enabled, the testing unit 90 responds with a RequestSucess status, but makes no state transition.

When in the running state 140, the state machine 116 monitors the status of the self-test 88 to detect when the test 88 is completed and whether the test passed or failed. Upon entering the running state 140, the periodic timer 114 is reinitialized with the TestPeriodic variable, if enabled. The TestRunning status is set, and the TestDenied status is cleared. Additionally, the testing unit 90 sends a message to the field device to obtain information pertaining to the operation of the test. If the field device is a HART device, the testing unit 90 may send a Read Dynamic Variables HART request to the field device, and then send a Read Additional Device Status HART request to the device to monitor the state of the test. These requests are repeated each scan until the field device completes the test, which may be indicated in a HART device by the diagnostics mode being cleared. Upon completion of the test, the testing unit 90 reads the results of the test in whatever form those results are provided by the self-test routine 88. If the test indicated a failure of the device, such as a valve being stuck in a partial valve stroke test, the state machine 116 sets the TestFailed status, and clears the TestSuccess and TestRunning statuses. At this point the state machine 116 transitions back to the ready state 134. On the other hand, if the tests indicates that the device passed the test, the state machine 116 sets the TestSuccess status and clears the TestFailed and TestRunning statuses, and then transitions back to the ready state 134. Of course, other results besides a failure and success may be provided in any desired form.

If, during the running state 140, the testing unit 90 loses communications with the field device, the state machine 116 transitions to the no communication state 130. If the testing unit 90 is reconfigured such that both the TestPeriodic variable and the TestOnDemand variable are disabled, the state machine 116 transitions to the preconfigured state 140. If the testing unit 90 receives a Test Start request and the TestOnDemand has been enabled, the testing unit 90 responds with a RequestSucess status and remains in the running state 140.

In the disabled state 142, the state machine 116 prevents any testing from occurring, as this state is entered when the field device does not support the self-test being requested and either TestPeriodic or the TestOnDemand variable has been enabled. Upon entering into this state, the state machine 116 sets the TestNotSupported status, indicating that the test is not supported in the field device. When in the disabled state 142, the testing unit 90 may periodically send read requests to the field device, such as a Read Dynamic Variables HART request in a HART field device, to periodically determine if the self-test is supported. If the testing unit 90 loses communications with the field device, the state machine 116 transitions to the no communication state 130. If, when in the disabled state 142, the testing unit 90 receives a TestStart request, the state machine responds with a RequestFailed status.

When in any of the preconfigured state 132, the ready state 134, the start state 136, the running state 140 and the disabled state 142, the testing unit 90 may read or interpret any status fields that may exist within the messages from the field device to determine if the field device has a problem or is in an abnormal condition (apart from one detected by the self-test 88) that may prevent the field device from operating properly. If a bad, abnormal or otherwise faulty status is present in the messages from the field device, the testing unit 90 may send a bad status message, an alarm or event or other message to a device or application (such as a controller or a user interface application) configured to receive that message. Thus, in addition to requesting and monitoring a self-test 88, the testing unit 90 may automatically determine, based on status messages from the field device, other potential problems with the field device that may prevent the field device from operating properly when sent a shut down signal. The testing unit 90 may, in fact, periodically initiate communications with the field device to receive these communication status messages (which are already provided in typical HART and Fieldbus communications) or may automatically view the status fields of any message sent from the field device, whether the field device is responding to the testing unit 90 or to some other message or command sent from a different device or application.

If desired, other messaging or statuses may be performed or set to provide other information about the operation of the testing unit 90. For example, a ReadTestTimeRemaining parameter may be used to provide the time remaining until the start of the next periodic test, a ReadTestTimeElapsed parameter may be used to provide the time elapsed since the last successful test and a ResetTestStatus may be used to acknowledge a bad status by clearing it (i.e., the LateStatus). In this case, if the testing unit receives a ReadTestTimeRemaining and the TestPeriodic variable is enabled, the testing unit 90 responds with the TestPeriodicTimer value. However, if the TestPeriodic variable is disabled, the testing unit 96 responds with a RequestFailed status. Additionally, if the testing unit 90 receives a ReadTestTimeElapsed request and at least one successful test has been completed, the testing unit 90 may respond with the TestElapsedTimer value. If a successful test has not yet been completed, the testing unit 90 may respond with a RequestFailed status.

As will be understood, the logic of the state machine 116 may be accomplished or defined by manipulation of internal parameters that can be exposed as condition inputs to the testing unit 90. Also, while the state diagram 120 of FIG. 4 illustrates one manner of enabling the state machine 116 to transition between different states associated with initiating and monitoring a self-test, it will be understood that the state machine 116 could be designed to use fewer of these states or additional states or some combination of the two. Furthermore, the operation of the testing unit enables the testing unit 90 to provide additional functionality over that normally provided in known manners of communicating with self-testing routines because it enables the self-test routines 88 to be integrated into a control or safety system. Of course, if desired, the testing unit 90 can produce any number of other outputs so as to provide information to, for example, an operator or other user or for use by other applications or control or safety routines within the process plant 10.

While the testing blocks 90 described herein have been illustrated as communicating with device self-tests 88 located within the particular field devices being tested, the device test 88 could, instead, be stored in the same device as the testing block 90 (that is, in a different device than the field device being tested) and, in fact, could be integrated into the testing block 90. In this configuration, the testing block 90 would initiate the device test 88, either as a separate application or as part of the testing block 90 in the, for example, the I/O device in which the testing block 90 is located. The device test 88 would then communicate with the field device under test as needed during implementation of the test via a communication network coupled between the field device and the device in which the device test 88 is located. The device test 88 would send the appropriate device commands and receive messages from the field device or from other devices to determine the result of the device test and would then provide this result to the testing block 90. Of course, the testing block 90 could essentially operate and communicate with the device test 88 in the manner described herein, except that communications between the testing unit 90 and the device test 88 would be within the same device and communications between the field device being tested and the device test 88 would be via an external communication network, such as a HART or Fieldbus network. The logic solver 56 of FIG. 1 is illustrated as including a device test 88*a* in the same device and internally coupled to one of the testing units 90. In this case, the device test 88*a* (which could be a part of or separate from the testing unit 90) communicates with one of the field devices 60, such as the field device 60*a* which does not include a device test therein, to implement the desired device test.

When implemented, any of the elements described herein, including the multiplexer, blocks, state machines, signal connections, etc. may be implemented in software stored in any computer readable memory such as on a magnetic disk, a laser or optical disk, or other storage medium, in a RAM or ROM of a computer or processor, etc. Signals and signal lines described herein can take any form, including actual wires, data registers, memory locations, etc. Also, the software, routines or programs discussed herein may take any form, including application software executed on a general purpose computer or processor or hard coded software burned into, for example, an application specific integrated circuit (ASIC), an EPROM, EEPROM, or any other firmware device. Likewise, this software may be delivered to a user, a process plant, an operator workstation, a controller, a logic solver or any other computing device using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel. Of course, the testing units 90 described herein can be implemented using any external process control communication protocol (including, for example, a Fieldbus or similar protocol) and may be used to communicate with any type of process entity including any function block or other application.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A testing entity for use in a process plant having a field device that stores and implements a self-testing routine during operation of a process and having a processor communicatively coupled to the field device, the testing entity comprising:
    a computer readable medium; and
    a test control program stored on the computer readable medium and adapted to be executed on the processor, the test control program including;
        a first communication entity adapted to be connected via a first external communication network to receive first communications from and to send second communications to one or more other entities within the process plant pertaining to the self-testing routine within the field device;
        a second communication entity adapted to communicate with the self-testing routine within the field device via a second external communication network; and a logic entity adapted to initiate the self-testing routine in response to the first communications received via the first communication entity, to receive a test result from the self-testing routine via the second communication entity and to provide an indication of the test result using the second communications via the first communication entity.

2. The testing entity of claim 1, wherein the logic entity is a state machine including a plurality of states, wherein a first one of the plurality of states is associated with initiating the self-testing routine and a second one of the plurality of states is associated with monitoring the results of the self-testing routine and providing the results to the one or more other entities within the process plant.

3. The testing entity of claim 2, wherein a third one of the states indicates that no communications have been established with the self-testing routine.

4. The testing entity of claim 2, wherein a third one of the states indicates that the logic entity has been configured and is ready to initiate the self-testing routine.

5. The testing entity of claim 2, wherein a third one of the states indicates that the logic entity is unable to initiate the self-testing routine because the field device does not support the self-testing routine.

6. The testing entity of claim 2, wherein a third one of the states indicates that the logic entity can communicate with the field device but is not configured to initiate the self-testing routine.

7. The testing entity of claim 2, wherein a third one of the states indicates that the self-testing routine is running.

8. The testing entity of claim 1, wherein the logic entity is configurable to initiate the self-testing routine on demand when receiving a signal via that first communication entity to initiate the self-testing routine.

9. The testing entity of claim 1, wherein the logic entity is configurable to initiate the self-testing routine periodically.

10. The testing entity of claim 9, wherein the logic entity includes a timer and a variable for storing a periodic rate at which to automatically and periodically implement the self-testing routine.

11. The testing entity of claim 10, wherein the logic entity includes a further variable indicating the elapsed time after a time at which a scheduled periodic self-testing routine that is to be implemented but has not yet been implemented at which to indicate, via the first communication entity, that implementation of the self-testing routine is late.

12. The testing entity of claim 1, wherein the logic entity is adapted to indicate via the first communication entity the success or failure of initiating the self-testing routine upon a request for initiation of the self-testing routine received via the first communication entity.

13. The testing entity of claim 1, wherein the logic entity is configurable to initiate the self-testing routine on demand when receiving a signal via that first communication entity to initiate the self-testing routine and is further configurable to initiate the self-testing routine periodically.

14. The testing entity of claim 1, wherein the logic entity is adapted to receive a device communication having a status field from the field device in which the self-testing routine is located, to determine an abnormal status associated with the field device from the status field and to provide an indication of the abnormal status of the field device using the second communications via the first communication entity when the abnormal status is detected.

15. A field device testing system for use in a process plant having a plurality of field devices connected to one or more controllers, the field device testing system comprising:

a device test associated with one of the field devices adapted to execute the device test on the field device when the field device is operating on-line within the process plant;

a testing unit communicatively connected to the one of the field devices via a first external communication network, the testing unit adapted to initiate the device test with respect to the field device and to obtain a result of the device test; and one or more additional process entities communicatively coupled to the testing unit via a second external communication network and adapted to send one or more signals to the testing unit to cause the testing unit to initiate the device test and to obtain the result of the device test.

16. The field device testing system of claim 15, wherein one of the one or more additional process entities is a user interface routine.

17. The field device testing system of claim 15, wherein one of the one or more additional process entities is process control routine that controls the operation of the field device.

18. The field device testing system of claim 15, wherein one of the one or more additional process entities is safety system control routine.

19. The field device testing system of claim 15, wherein the testing unit is adapted to initiate the device test on-demand in response to a test initiation signal from the one or more additional process entities.

20. The field device testing system of claim 15, wherein the testing unit is adapted to automatically periodically initiate the device test.

21. The field device testing system of claim 20, wherein the testing unit includes a timer used to track the time between successive initiations of the device test.

22. The field device testing system of claim 21, wherein the testing unit includes a configurable parameter that specifies a desired time between successive periodic initiations of the device test.

23. The field device testing system of claim 15, wherein the testing unit is adapted to initiate the device test on-demand in response to a test initiation signal from one of the one or more additional process entities and is further adapted to automatically periodically initiate the device test.

24. The field device testing system of clam 15, wherein the testing unit is adapted to initiate the device test in response to an on-demand test initiation signal from one of the one or more additional process entities, to obtain the result of the device test and to communicate the result of the device self-test to the one of the one or more additional process entities.

25. The field device testing system of claim 24, wherein the testing unit is adapted to communicate the successful or unsuccessful initiation of the device test to the one of the one or more additional process entities.

26. The field device testing system of claim 24, wherein the testing unit is adapted to communicate an indication that the device test is running to the one of the one or more additional process entities.

27. The field device testing system of claim 24, wherein the testing unit is adapted to communicate that the testing unit has not established communications with the field device to initiate the device test to the one of the one or more additional process entities.

28. The field device testing system of claim 24, wherein the testing unit is further adapted to receive a device communication having a status field from the field device on which the device test is to be implemented, to determine an abnormal status associated with the field device from the status field and to provide an indication of the abnormal status of the field device to the one of the one or more additional process entities when the abnormal status is detected.

29. The field device testing system of claim 15, wherein the device test is stored in the field device.

30. The field device testing system of claim 15, wherein the device test is stored in same device as the testing unit.

31. A method of implementing a device test in a process plant, comprising:

storing the device test for use in testing a field device within the process plant;

storing a testing unit within a second device within the process plant that is communicatively coupled to the field device;

communicatively coupling a further process entity within the process plant to the testing unit; and configuring the testing unit to initiate the device test while the process is operating, to automatically obtain a result of the device test and to automatically provide the result of the device test to the further process entity.

32. The method of implementing a device test of claim 31, wherein configuring the testing unit includes configuring the testing unit to initiate the device test when the testing unit receives a signal from the further process entity requesting that the device test be initiated.

33. The method of implementing a device test of claim 31, wherein configuring the testing unit includes configuring the testing unit to automatically, periodically initiate the device test.

34. The method of implementing a device test of claim 33, wherein storing the testing unit in the second device includes storing a logic entity that includes a variable indicating the elapsed time after a time at which a scheduled periodic device test is to be implemented but has not yet been implemented at which to indicate that implementation of the device test is late.

35. The method of implementing a device test of claim 33, wherein configuring the testing unit includes providing a time period to the testing unit at which the testing unit is to automatically periodically initiate the device test.

36. The method of implementing a device test of claim 31, wherein configuring the testing unit includes configuring the testing unit to initiate the device test when the testing unit receives a signal from the further process entity requesting that the device test be initiated and further configuring the testing unit to automatically, periodically initiate the device test.

37. The method of implementing a device test of claim 31, wherein storing the testing unit in the second device includes storing the testing unit in an input/output device communicatively coupled between a process controller and the field device.

38. The method of implementing a device test of claim 31, wherein storing the testing unit in the second device includes storing a logic entity that is transitionable between a plurality of states, wherein a first one of the plurality of states is associated with initiating the device test and a second one of the plurality of states is associated with monitoring the result of the device test and making the result accessible to the further process entity.

39. The method of implementing a device test of claim 38, wherein storing the logic entity includes storing a logic entity that is transitionable to a third state that indicates that no communications have been established with the field device on which the device test is to be implemented.

40. The method of implementing a device test of claim 38, wherein storing the logic entity includes storing a logic entity that is transitionable to a third state that indicates that the logic entity has been configured and is ready to initiate the device test.

41. The method of implementing a device test of claim 38, wherein storing the logic entity includes storing a logic entity that is transitionable to a third state that indicates that the logic entity is unable to initiate the device test because the field device does nut support the device test.

42. The method of implementing a device test of claim 38, wherein storing the logic entity includes storing a logic entity that is transitionable to a third state that indicates that the logic entity can communicate with the field device but is not configured to initiate the device test.

43. The method of implementing a device test of claim 31, wherein storing the testing unit in the second device includes staring a logic entity that is adapted to indicate the success or failure of initiating the device test upon a request for initiation of the device test.

44. The method of implementing a device test of claim 31, wherein configuring the testing unit includes configuring the testing unit to receive a device communication having a status field from the field device on which the device test is to be implemented, to determine an abnormal status associated with the field device from the status field and to provide an indication of the abnormal status of the field device to the further process entity when the abnormal status is detected.

45. The method implementing a device test of claim 31, wherein storing the device test for use in testing a field device within the process plant includes storing the device test within the field device.

46. The method implementing a device test of claim 31, wherein storing the device test for use in testing a field device within the process plant includes storing the device test within the second device.

47. A testing entity for use in a process plant having a field device that communicates via a communication network using a device message having a status field that indicates a status associated with the field device, and having a processor communicatively coupled to the field device via the communication network, the testing entity comprising:

a computer readable medium; and a field device monitoring program stored on the computer readable medium and adapted to be executed on the processor, the field device monitoring program including;

a first communication entity adapted to he connected to receive first communications from and to send second communications to one or more other entities within the process plant pertaining to the field device;

a second communication entity adapted to communicate with the field device via the communication network; and a logic entity adapted to automatically process the status field of a device message received via the second communication entity from the field device to determine if an abnormal status is associated with the field device and to provide an indication that an abnormal status is associated with the field device using the second communications via the first communication entity when an abnormal status is present in the status field of the device message.

48. The testing entity of claim 47, wherein the logic entity is configured to process the status field of each device message received via the second communication entity to determine if an abnormal status is associated with the field device from the status field of each of the device messages and to provide an indication of an abnormal status of the field device using the second communications via the first communication entity when an abnormal status exists within the status field of one of the device messages.

49. The testing entity of claim 47, wherein the first communication entity is configured to communicate using a first communication protocol and wherein the second communication entity is configured to communicate with the field device using a second communication protocol that is different than the first communication protocol.

50. The testing entity of claim 47, wherein the logic entity is adapted to automatically send a test message to the field device to cause the field device to respond with a device message having a status field.

51. A testing entity for use in a process plant having a field device and having a processor communicatively coupled to the field device, the testing entity comprising:
 a computer readable medium; and
 a test control program stored on the computer readable medium and adapted to be executed on the processor, the test control program including;
  a device testing routine adapted to perform a diagnostic test on the field device during normal operation of the process;
  a first communication entity adapted to be connected via a first external communication network to receive first communications from and to send second communications to one or more other entities within the process plant pertaining to the device testing routine;
  a second communication entity adapted to communicate with the field device via a second external communication network; and
  a logic entity adapted to initiate the device testing routine in response to the first communications received via the first communication entity to cause the device testing routine to communicate with the field device via the second communication entity, to receive a test result from the device testing routine and to provide an indication of the test result using the second communications via the first communication entity.

52. The testing entity of claim 51, wherein the logic entity is a state machine including a plurality of states, wherein a first one of the plurality of states is associated with initiating the device testing routine and a second one of the plurality of states is associated with monitoring the results of the device testing routine and providing the results to the one or more other entities within the process plant.

53. The testing entity of claim 52, wherein a third one of the states indicates that no communications have been established with the field device.

54. The testing entity of claim 52, wherein a third one of the states indicates that the logic entity has been configured and is ready to initiate the device testing routine.

55. The testing entity of claim 52, wherein a third one of the states indicates that the logic entity can communicate with the field device but is not configured to initiate the device testing routine.

56. The testing entity of claim 51, wherein the logic entity is configurable to initiate the device testing routine on demand when receiving a signal via that first communication entity to initiate the device testing routine.

57. The testing entity of claim 51, wherein the logic entity is configurable to initiate the device testing routine periodically.

58. The testing entity of claim 57, wherein the logic entity includes a timer and a variable for storing a periodic rate at which to automatically and periodically implement the device testing routine.

59. The testing entity of claim 58, wherein the logic entity includes a further variable indicating the elapsed time after a time at which a scheduled periodic device testing routine that is to be implemented but has not yet been implemented at which to indicate, via the first communication entity, that implementation of the device testing routine is late.

60. The testing entity of claim 51, wherein the logic entity is adapted to indicate via the first communication entity the success or failure of initiating the device testing routine upon a request for initiation of the device testing routine received via the first communication entity.

61. The testing entity of claim 51, wherein the logic entity is configurable to initiate the device testing routine on demand when receiving a signal via the first communication entity to initiate the device testing routine and is further configurable to initiate the device testing routine periodically.

62. The testing entity of claim 51, wherein the logic entity is adapted to receive a device communication having a status field from the field device on which the device testing routine is to be implemented, to determine an abnormal status associated with the field device from the status field and to provide an indication of the abnormal status of the field device using the second communications via the first communication entity when the abnormal status is detected.

* * * * *

UNITED STATES PATENT AND TRADEMARK OFFICE
CERTIFICATE OF CORRECTION

PATENT NO. : 6,898,542 B2
DATED : May 24, 2005
INVENTOR(S) : Michael G. Ott et al.

It is certified that error appears in the above-identified patent and that said Letters Patent is hereby corrected as shown below:

<u>Column 20,</u>
Line 10, please delete "nut" and insert -- not --.
Line 18, please delete "staring" and insert -- storing --.
Line 49, please delete "he" and insert -- be --.

Signed and Sealed this

Sixth Day of September, 2005

JON W. DUDAS
*Director of the United States Patent and Trademark Office*